April 26, 1932.   C. P. SCHILPP   1,855,365
SPINNER
Filed Aug. 20, 1929

Inventor
Charles P. Schilpp
By Hoagland Canfield
Attorney

Patented Apr. 26, 1932

1,855,365

UNITED STATES PATENT OFFICE

CHARLES P. SCHILPP, OF CLEVELAND HEIGHTS, OHIO, ASSIGNOR TO THE AMERICAN FORK & HOE COMPANY, OF CLEVELAND, OHIO, A CORPORATION OF OHIO

SPINNER

Application filed August 20, 1929. Serial No. 387,206.

My invention relates to spinners and relates particularly to that type of rotatable apparatus commonly employed as a lure to attract fish, adapted for use in fishing and more particularly adapted for use in casting or trolling.

An object of my invention is to devise a practical form of spinning lure for fish lines, which is of very simple construction and whose rotary element is formed from a single piece of metal.

Another object is to provide an improved spinner for fish lines, which can be manufactured and sold at a very low cost.

Another object is to provide an improved form of spinner which is efficient in operation and inexpensive to manufacture, and being made in a minimum of manufacturing operations.

Another object is to provide an improved and efficient form of spinner which is so formed as to avoid being caught in weeds or the like growing in the water or the like.

Other objects of my invention and the invention itself will be better understood by reference to the following description of an embodiment of my invention and from the drawings illustrating the said embodiment forming a part of this specification.

Referring to the drawings.

Figure 3:
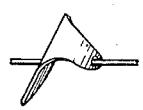
Fig. 3 is a side elevational view of the spinner of Figs. 1 and 2, shown in a different rotative position on a fragment of the spinner rod from that illustrated in Fig. 1.
Figure 1:
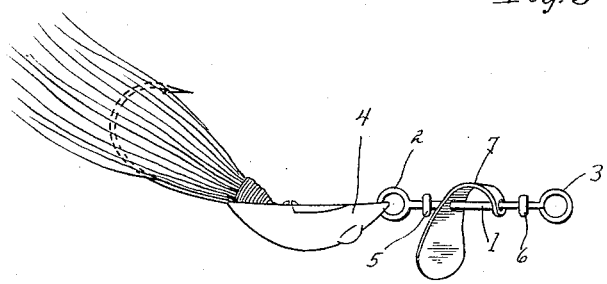
Fig. 1 is a side elevational view of an embodiment of my invention together with an artificial bait with secured hook attached thereto.
Figure 2:
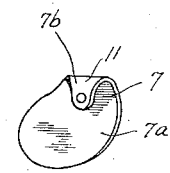
Fig. 2 is a plan view of the rotatable element of my improved spinner, per se.
Figures 4, 5:
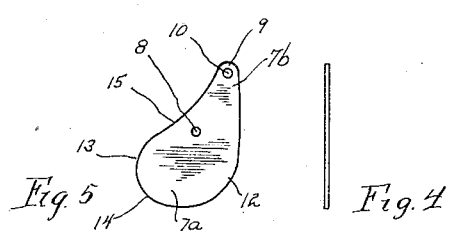
Figures 6, 7:
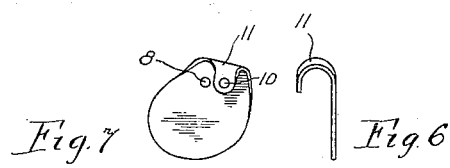

Figs. 4 and 5 respectively are side edge and plan views of the blank shown perforated in Fig. 5, from which the rotative element of the spinner of my invention is formed;

Figs. 6 and 7 respectively are views taken in the plane of and normal to the plane of the blade portion of the said rotatable element of Fig. 2.

Referring now to the different figures of the drawings in all of which like parts are designated by like reference characters:

The spinner of my invention comprises a spinner rod 1, preferably formed at its two ends with eyes 2 and 3, the eye 3 adapted for attachment to the end of a fish line and the eye 2 adapted to support a hook supporting bait 4, which may be of any known type.

Stop rings 5 and 6 are preferably loosely telescoped onto the intermediate portion of the rod 1 and are adapted to be engaged by the rotary element 7, which is loosely fitted onto the intermediate portion of the rod 1 between the stop rings 5 and 6.

The rotary element 7 is formed from a sheet metal blank cut in the form shown in Figs. 4 and 5 being in outline of somewhat pear-shape form, having an enlarged blade portion 7a, which is provided with a bearing forming perforation 8, and a reversely turned loop 7b which is narrower than the blade 7a, being made progressively narrower from the junction with the blade toward its end 9, which is perforated to form at 10 a rod bearing.

The perforated blank, as shown in Fig. 5, is then bent in its narrowed portion 7b intermediate the perforations 8 and 10 to form the loop 11, the bending being accomplished, however, in such a way that the two perforations will be disposed in a line inclined to the plane of the blade 7a and to any plane normal thereto.

Preferably, this is accomplished by turning the narrowed portion or tongue 7b inwardly over the blade, but in a direction which is laterally disposed relative to the perforation 8.

This arrangement is provided so that when the rod 1 is projected through the perforations 8 and 10, the blade 7a will be inclined to a plane normal to that of the blade. The blade itself is so formed that its leading edge 12 is preferably convexly formed throughout, but the trailing edge comprises a convex edge portion 13 adjacent the tip of the blade 14 and a preferably concave edge portion 15, which joins the convex portion 13 and the corresponding edge of the looped tongue 11.

This gives the blade a propeller like form and together with the inclination of the blade to the rod effects spinning of the rotary element 7 when the rod carrying the blade is drawn through water.

When so drawn through water, the stop rings 5 and 6 will engage the outer surfaces of the element adjacent the perforations 8 and 9, the ring 5 forming a positive stop and bearing for the blade 7a, its round outer surface coacting with the outer surface of the blade to effect rotation of the blade thereon with a minimum of friction tending to restrain the blade.

Having thus described my invention, I am aware that numerous and extensive modifications and departures may be made from the embodiment herein described, but without departing from the spirit of my invention.

I claim:

1. In a spinner mechanism for fishing lines comprising a spinner rod, a rotor journalled thereon, said rotor in the form of a single piece of material bent to substantially U-form, and twisted throughout substantially its entire length to substantially the form of a screw propeller, with a trailing arm thereof of greater length and area than a leading arm thereof, each of said arms having a perforation therethrough, said rod extending through said perforations, said larger arm comprising a water engaging blade extending laterally to one side of said rod and inclined to the axis thereof.

2. In a spinner mechanism for fishing lines comprising a spinner rod, and a rotor journalled thereon, said rotor being formed from a single piece of planar material generally of pear-shape, and twisted throughout substantially its entire length to substantially the form of a screw propeller, provided with two spaced perforations for said rod and bent to align the perforations along a line at an angle to the plane of the material.

3. In a spinner mechanism for fishing lines comprising a spinner rod, and a rotor journalled thereon, said rotor being formed from a single piece of planar material blanked out in general of pear-shape, and twisted throughout substantially its entire length to substantially the form of a screw propeller, provided with two perforations for receiving the rod, one of the perforations being in the small end of the blank and the other spaced therefrom toward the large end of the blank, and the small end of the blank being bent to align the perforations on a line at an angle to the plane of the blank.

4. In a spinner mechanism for fishing lines comprising a spinner rod, a rotor journaled thereon, said rotor in the form of a single piece of material bent into substantially U-form with a trailing arm thereof of greater length and area than a leading arm thereof, each of said arms having a perforation therethrough, said rod extending through said perforations, said larger arm comprising a water engaging blade extending laterally to one side of said rod and inclined to the axis thereof, and also inclined to an axis at an angle to the axis of the rod.

In testimony whereof I hereunto affix my signature this 12th day of August, 1929.

CHARLES P. SCHILPP.